Oct. 10, 1950  H. T. HODGES  2,525,549
TWO-BLADE SHUTTER-LEAF CONTROL
Filed March 26, 1949

HOWARD T. HODGES
INVENTOR

BY

ATTORNEYS

Patented Oct. 10, 1950

2,525,549

UNITED STATES PATENT OFFICE 2,525,549

TWO-BLADE SHUTTER-LEAF CONTROL

Howard T. Hodges, Rochester, N. Y., assignor to Eastman Kodak Company, Rochester, N. Y., a corporation of New Jersey Application March 26, 1949, Serial No. 83,587

5 Claims. (Cl. 95—62)

This invention relates to photography and particularly to camera shutters. One object of my invention is to provide an extremely simple and inexpensive camera shutter. Another object is to provide a shutter blade control and driving mechanism so arranged that rebound of the shutter blades is prevented. Another object of my invention is to provide a shutter constructed from inexpensive stamped metal parts which can be readily assembled. Other objects will appear from the following specification, the novel features being particularly pointed out in the claims at the end thereof.

Coming now to the drawings wherein like reference characters denote like parts throughout:

Figure 1:
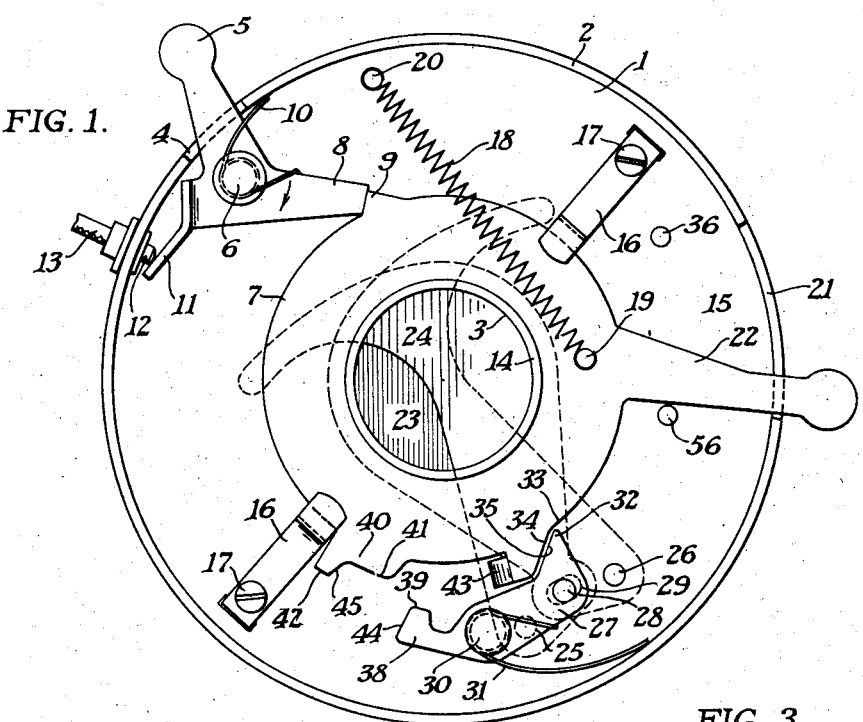
Fig. 1 is a top plan view of a shutter employing a shutter blade control and driving mechanism constructed in accordance with and embodying a preferred form of my invention. The shutter is shown with the shutter cover removed and with the shutter in a set position ready to make an exposure when the trigger is released.

In photographic shutters, where the shutter blades may be made of relatively thin material, such as, for instance, .0025-inch metal, the shutter blades may be driven rapidly to open and to close. It frequently happens that when the shutter blades come rapidly to a stop, they tend to rebound, occasionally admitting unwanted light to the camera. In order to prevent rebound, and to control the movement of the lever driving the shutter blades throughout its exposure-making movements, I have provided a mechanism which not only prevents shutter rebound, but guides the shutter-driving lever in a manner which will be fully described.

The shutter may consist of the usual casing 1 having an upstanding flange 2 around the periphery and an exposure aperture 3 in the center. The flange 2 may be slotted at 4 so that a trigger 5, turning upon a pivot 6, may be moved from the outside of the shutter to release a master member 7 latched by the trigger arm 8 and the latch element 9 on the inside of the shutter. The trigger may be provided with a spring 10 tending to turn the trigger in the direction shown by the arrow. If desired, the trigger may have an extension 11 which may be engaged by the plunger 12 of a cable release 13 of any standard type.

The exposure aperture 3 may be formed by the inner wall of an upstanding flange 14 and this flange may form a bearing for the ring-shaped master member 7, so that the master member may turn on this bearing. The master member may be held against a mechanism plate 15 by means of a pair of oppositely spaced spring clips 16 attached to the mechanism plate by means of screws 17. A power spring 18 may be attached to the ring-shaped master member as by a pin 19 at one end, and a second pin 20 may be attached at the other end of the spring; this latter spring being preferably carried by the mechanism plate 15.

There is a slot 21 in the flange 2 through which a setting arm 22, which is preferably integral with the ring-shaped master member, may pass for setting the shutter, thereby tensioning the spring 18 when it is moved to its set position in Fig. 1.

A pair of shutter blades 23 and 24 normally cover the exposure opening 3. These blades are pivoted on studs 25 and 26 and both blades are operably connected to an opening lever 27. This connection may include a pin 28 carried by the opening lever extending through slots 29; one in blade 23 and a second slot carried by blade 24. Thus, when the pin 28 moves normal to a line drawn between the pivots 25 and 26, or nearly normal thereto as it turns about the supporting stud 30, the blades will open when the lever 27 moves the stud 28 away from the center of the shutter and the blades will close the aperture when the stud 28 moves in an opposite direction.

A spring 31 tends to move the stud 28 toward the center of the shutter, but in its normal rest position this movement has already taken place and the end 32 of the lever may rest on the surface 33 of the master member.

Figure 2:
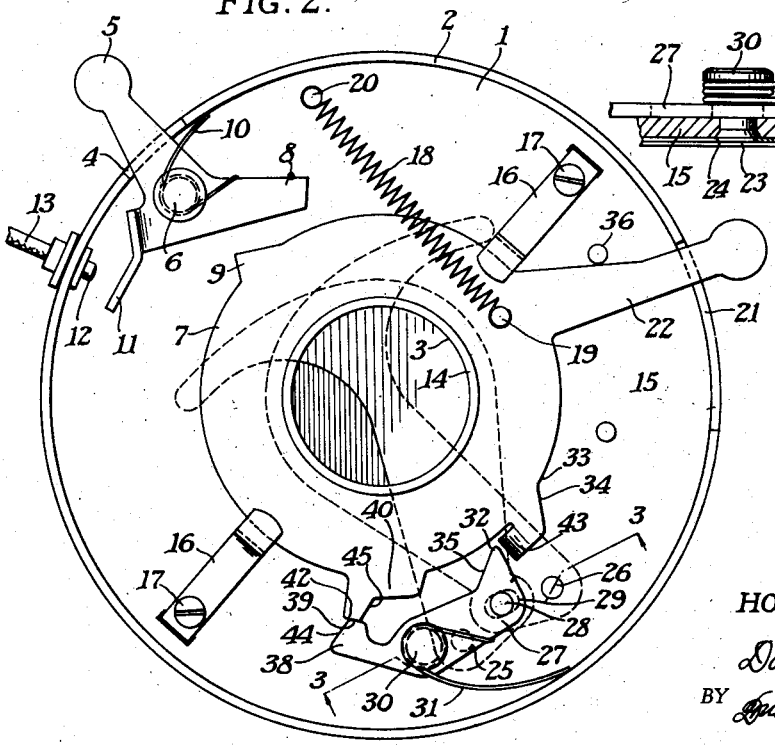
Fig. 2 is a view similar to Fig. 1 but with the shutter parts in the position they assume after an exposure has been made and the parts have returned to their rest position.

When in a set position, there is a cam 34 on the master member which lies adjacent an opening cam 35 on the lever 27. Consequently, when the trigger 5 is depressed, and the latch elements 8 and 9 released, the master member may swing in a counterclockwise direction with reference to Fig. 1 toward the stop pin 36. This pin lies in the path of the setting arm 22 and will be contacted by this arm after an exposure, as indicated in Fig. 2. As the ring master member moves, the interengaging cams 34 and 35 quickly swing the lever 27 so that the pin 28 moves away from the center of the shutter, opening the shutter blades 23 and 24. This movement causes an arm 38 on the lever 27 to move in a reverse direction—that is, toward the master member so that the end 39 of this arm will move to a position in which it may lie adjacent a shoulder 40 which is formed in two steps; the first step comprising a portion 41 and the second step comprising a portion 42 farther away from the center of the shutter than step 41. An inclined ramp 45 connects these two steps. Therefore, when arm 39 is moved inwardly, it may engage and ride along the first step 41 until the end 44 reaches the ramp 45, at which time it may ride up the ramp and on top of the second step 42, thereby preventing any outward movement of the stud 28 after the exposure has been completed and while the parts are in their rest position, as is shown in Fig. 2. It should be noticed here that the spring 31 tends to move the lever 27 in such a direction that the end 39 of the arm may ride up the ramp, either in contact with it, if the master member is moving faster than the lever driven by the spring 31, or it may ride adjacent to it without perhaps actually touching it if the spring 31 drives the lever 27 faster than the movement of the master member. In any event, since the spring is moving the lever 27 inwardly, as soon as the end 32 of the lever slips off the end of the opening lug 34, both the spring and the end 44 and ramp 45 all tend to move the lever in the same direction and at the same time. The blades must therefore be definitely closed.

This has a number of advantages. First, it insures that the lever 27 will move rapidly in a closing direction. Second, it insures that when once moved to its Fig. 2 or closed position, the blades will definitely be held closed and rebound will be prevented.

Figure 3:
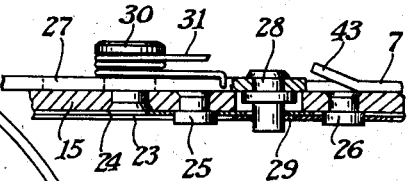
Fig. 3 is an enlarged sectional fragmentary view taken on line 3—3 of Fig. 2.

It should be noticed that the opening cam 34 on the master member is carried by a projection on the master member which includes an inclined end 43, as best shown in Fig. 3. When the setting lever 22 is moved in a clockwise direction, the lever 27 will not move because of this incline 43 which will ride up over the end 32 on the opening lever and drop down behind the cam 35 thereof so that the opening cams 34 and 35 will lie adjacent and in the Fig. 1 position.

As will be readily seen from the drawings and from the above description, the mechanism for controlling the shutter blades is extremely simple; the parts may be made of stamped metal, and the parts are few and simple in nature. Such a structure can be readily assembled, and there is very little to get out of order on a shutter of this type. The movement of the master member is limited in both directions; in a counter-clockwise direction by pin 36 and in a clockwise direction by a stop pin 56. It is not necessary that the opening cams 34 and 35 should lie in contact when the shutter is set, and, if desired, they may be spaced a considerable distance to facilitate getting the master member up to speed before the cams strike each other, although this is not necessary with a shutter having a comparatively low speed, such as, 1/200 of a second.

It should be noticed also that the shutter control lever remains stationary during the setting movement because of the upwardly inclined lug 43 on the master member which readily rides up over the end 32 of the lever 27. This is especially true because the master member 7 is held against the mechanism plate 15 by means of spring clips 16. However, in the opposite direction of movement of the master member 7—that is, in the exposure-making direction—the movement of the master member causes the cam 34 and the stepped shoulder 40 to swing through their arcuate paths simultaneously controlling both the opening movement of the lever 27 and the closing movement thereof. During the opening movement, the cams 34 and 35 cause the lever 27 to swing in a clockwise direction with reference to Fig. 1, thereby bringing the end 39 of arm 38 adjacent the first step 41 of the shoulder 40. Continued movement of the master member permits the spring 31, or the ramp 45, or both, to rapidly close the shutter blades by swinging the lever 27 upon its pivot 30. Finally, when the exposure is over and the parts are in their rest position, shown in Fig. 2, the lever is definitely held by the end 39 and step 42 of the master member from further movement; thereby not only eliminating rebound but preventing accidental movement of the shutter blades due to a shock or blow applied to the shutter as may happen when a camera is subjected to shock.

Having thus described my invention, what I claim is new and desire to secure by Letters Patent of the United States is:

1. In a shutter of the type including an apertured shutter casing, a pair of pivotally mounted shutter blades movable to open and close the aperture in the casing, a pivoted lever carrying a stud engaging the shutter leaves and movable normal to a line between the shutter blade pivots to open and close the shutter blades, an oscillatable ring master member encircling the exposure aperture, a power spring for moving the ring master member a fixed distance in one direction, a trigger, and a setting lever carried by the ring master member for moving it to set the spring and latch the master member against the trigger in a tensioned position, the combination with said master member, of an opening cam thereon, a cam on said pivoted lever positioned for engagement with the opening cam to be moved thereby for opening the shutter leaves, a closing spring tending to close the shutter leaves and to turn the pivoted lever cam toward the ring master member, said pivoted lever including an arm also lying adjacent the path of movement of the master member, a cam follower on the opposite end of the pivoted arm from that end carrying the cam, and outwardly extending surfaces on the periphery of the master member lying adjacent the path of movement of the cam follower on the arm and adapted to lie adjacent thereto after the master member cam has moved the lever cam to open the shutter blades, the closing spring tending to hold the interengaging surfaces of the master member and arm out of contact in normal operation, whereby said adjacent interengaging surfaces may prevent material rebound of the lever against the pressure of the closing spring.

2. The shutter defined in claim 1 characterized by the one of the surfaces on the periphery of the master member normally lying adjacent the cam follower carried by the lever lying in a position to block movement of the lever when the master member is in a rest position with the driving spring untensioned and with the shutter blades at rest.

3. The shutter defined in claim 1 characterized by the surfaces carried by the periphery of the master member comprising two stepped shoulders projecting radially from the periphery of the master member, the first step lying adjacent the arm on the lever when the latter moves to the blade-open position, and the second step lying adjacent the arm on the lever when the latter moves to a blade-closed position.

4. The shutter defined in claim 1 characterized by the interengaging surface on the master member comprising two stepped shoulders, extending radially from the periphery of the ring master member, a ramp between the steps of the shoulder, the end of the arm having a shape complemental to the ramp for coaction therewith to assist the closing spring in closing the blades, the first step of the stepped shoulder lying adjacent the arm when said lever is in a blade-opened position; the second step lying adjacent the arm when the lever is in a blade-closed position.

5. In a shutter of the type including an apertured shutter casing, a pair of pivotally mounted shutter blades movable to open and close the aperture in the casing, a pivoted lever carrying a stud engaging the shutter leaves and movable normal to a line between the shutter blade pivots to open and close the shutter blades, an oscillatable ring master member encircling the exposure aperture, a power spring for moving the ring master member a fixed distance in one direction, a trigger, and a setting lever carried by the ring master member for moving it to set the spring and latch the master member against the trigger in a tensioned position, the combination with said master member, of an opening cam thereon, two interengageable surfaces, carried by the master member spaced from the opening cam approximately the length of the pivoted lever, said opening cam and interengageable surfaces projecting outwardly from the ring master member beyond the circumference thereof to move through arcuate paths, the pivoted lever having a cam for engaging the opening cam and a cam follower for engaging the interengageable surfaces carried by the ring master member, the interengageable surfaces on the cam and arm extending in a generally circumferential direction with respect to the ring master member, the arm being adapted to be rocked about the lever pivot by the master member moving under its power spring, the opening cam and interengageable surfaces lying adjacent to the cam on the lever and the arm on the lever for controlling movement thereof throughout the exposure-making movement of the master member, the opening cam including a beveled lug for riding over the lever cam when the master member is set whereby said lever and arm may remain stationary during movement of the master member in a power spring tensioning direction, and a spring tending to hold the lever and arm in their stationary position whereby the opening cam may swing said lever about its pivot to open the shutter blades, and the pivoted lever spring may, upon slip-off of the beveled lug and opening cam, swing the pivoted lever in a reverse direction so that the opposite end of said arm may follow a path defined by the interengageable surfaces with or without contact therewith.

HOWARD T. HODGES.

REFERENCES CITED

The following references are of record in the file of this patent:

UNITED STATES PATENTS

| Number | Name | Date |
| --- | --- | --- |
| 761,754 | Brueck | June 7, 1904 |
| 764,421 | Bullard | July 5, 1904 |
| 2,214,754 | Strassenburg | Sept. 17, 1940 |
| 2,295,812 | Strassenburg | Sept. 15, 1942 |